(No Model.) 2 Sheets—Sheet 1.

H. L. LONG.
CHECK ROW PLANTER.

No. 270,232. Patented Jan. 9, 1883.

Attest:
Herm. Lauten
Wm. C. Henderson

Inventor:
Henry L. Long.
By H. S. Abbot,
Attorney (No Model.) 2 Sheets—Sheet 2.

H. L. LONG.
CHECK ROW PLANTER.

No. 270,232. Patented Jan. 9, 1883.

UNITED STATES PATENT OFFICE.

HENRY L. LONG, OF KEITHSBURG, ILLINOIS.

CHECK-ROW PLANTER.

SPECIFICATION forming part of Letters Patent No. 270,232, dated January 9, 1883.

Application filed April 13, 1881. (No model.)

*To all whom it may concern:*

Be it known that I, HENRY L. LONG, a citizen of the United States, residing at Keithsburg, in the county of Mercer and State of Illinois, have invented certain new and useful Improvements in Check-Row Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1:
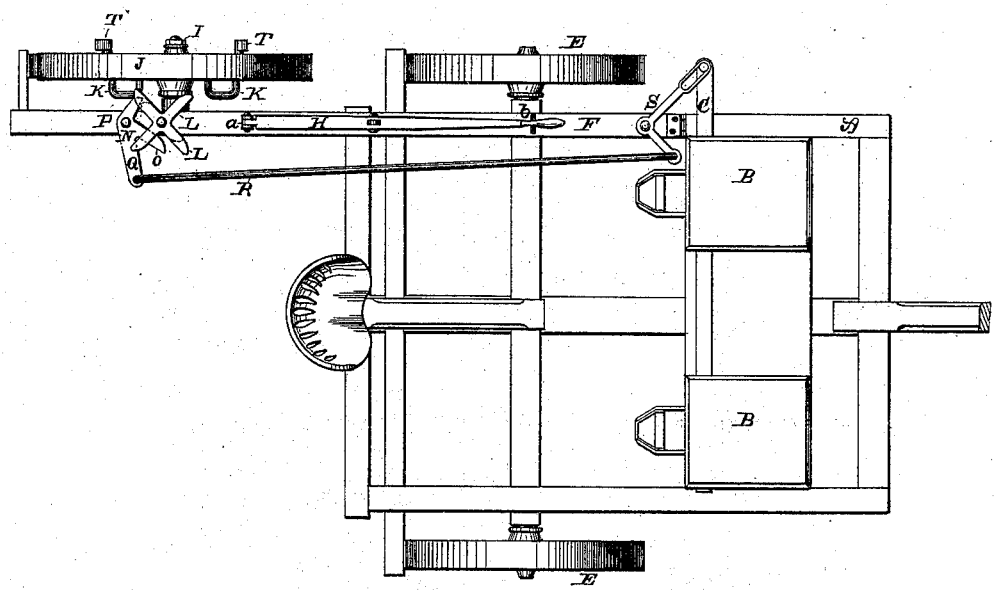
Figure 2:
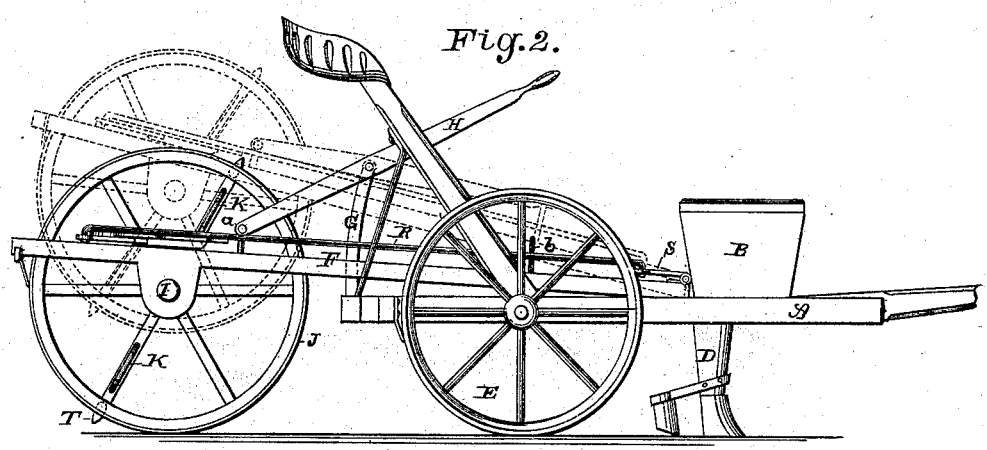
Figure 3:
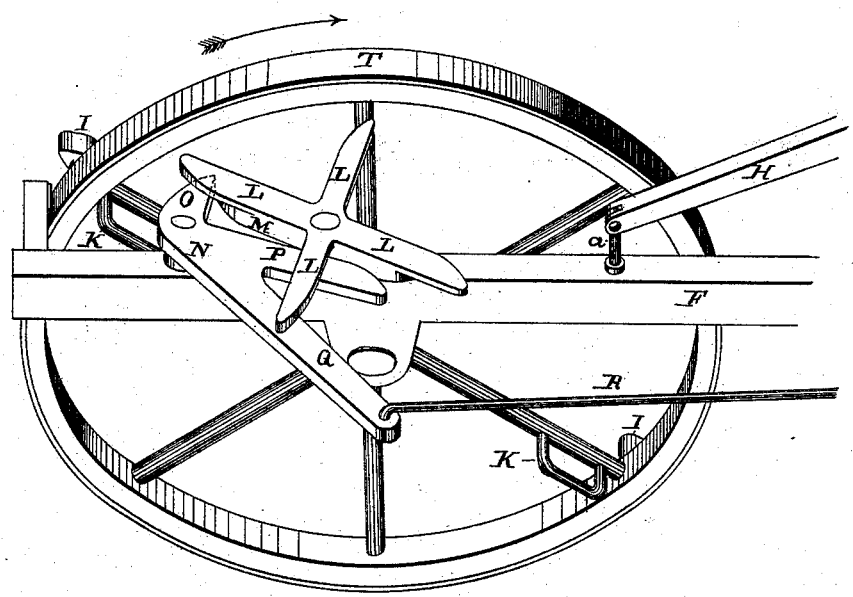

Figure 1 is a plan of the planter with check-row attachment down. Fig. 2 is a side elevation of the same, showing the attachment down in full lines and raised in dotted lines. Fig. 3 is a perspective of the check-row attachment, looking from the side with the attachment inclined toward you from the top; and Fig. 4, a bottom view of the revolving fingers detached from the frame.

My invention has reference to check-row planters; and it consists in the construction and combination of parts hereinafter particularly described, and then sought to be specifically defined by the claim.

In the accompanying drawings, the letter A indicates the frame; B, the grain-boxes; C, the slide; D, the seed-tubes, and E the wheels of the frame. These several parts are all of the ordinary construction, and therefore will not be described more in detail; but I will now describe the parts which embody my invention.

The letter F indicates a bar, hinged at its forward end to either side of the frame A, and braced against any side wrenching by an upright rod, G, joined rigidly to the rear end of frame A and passed through a slot in bar F, or through a loop formed by driving a staple into the side of the bar, or a guide otherwise formed; but, whatever means may be employed, the bar is to be free to swing up and down from the point of its hinged connection to the main frame. This bar can be raised and lowered by means of a lever, H, hinged to the bar, as seen at *a*, and fulcrumed to the rod G, and located so as to be within the reach of the driver, and it may be held down by a hook, *b*, driven into bar F, so that the bar and its attachments may be elevated, as shown by dotted lines in Fig. 2, when the planter is to be turned around at the end of a row.

On an axle, I, connected to one side of the bar F, near its rear end, there is journaled a wheel, J, which rests on the ground when the frame is lowered, and which is located back of one of the wheels E, on a line therewith, so that it may run on the comparatively even and smooth ground, made so by the wheel E pressing down and crushing the clods over which it runs, and thereby preventing to a great extent the rough up-and-down motion of the planter-frame from being communicated to the hinged bar carrying the wheel and other attachments, which, if allowed, would interfere with the free and accurate working of the seed-dropping mechanism.

Figure 4:
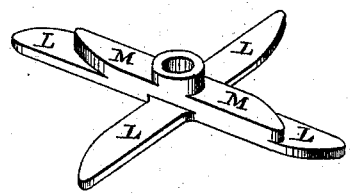

To two or more of the spokes of the wheel J there is secured a staple or pin, K, or equivalent projecting device, in a position that will cause it in the revolution of the wheel to strike against the fingers L and revolve the same. The fingers L, of which there are four, and all connected at a common center, are journaled on an axle secured to the top of bar F, so as to turn in a horizontal plane. To the under side of two of these fingers, which run in straight lines from each other, there is secured by casting therewith or otherwise a lug, M, the opposite extreme faces of which are preferably beveled, as shown in Fig. 4, so as to relieve the jar that would result if the ends were sharp angles when in the course of the turning of the fingers the lug strikes other fingers to be described.

To the bar F, back of the fingers L, there is pivoted or journaled what will be termed an "oscillating trigger," N, having fingers O P at right angles to each other, and provided with an arm, Q, which is connected by means of a rod, R, to one end of a crank-lever, S, which is pivoted or journaled to the bar F at or about the point where it is hinged to the frame A, the other end of the lever being connected to the end of the slide C, as seen in Fig. 1. Now, when the pins on the spokes of wheel J strike the fingers L, they are revolved, and bring first one end and then the other of lug M against first one and then the other of the two fingers O and P, whereby the arm Q is oscillated back and forth, thereby imparting through rod R and crank S a reciprocating motion to the slide C, whereby the grain is automatically fed to and cut off from the tubes D.

A series of studs, T, are placed along the rim or tire of the wheel J at regular distances apart, so as to accurately mark, by making depressions in the ground, just where the corn has been dropped.

Instead of locating the seed-boxes as shown, they may be located one each immediately in front of the running-wheels, in which event the crank S will be positioned so as to be connected by a rod or otherwise to the slide at a point between the seed-boxes, the slide being moved to and fro in the same manner as that already described.

The trigger and fingers may be protected by a boxing or shield placed over them and secured to the bar F.

I am aware that it is not new to arrange an operating-wheel to travel in the rear or track of the bearing-wheel, thereby affording a smooth path for said wheel, and such devices I do not wish to be understood as claiming broadly as of my invention; but it is absolutely necessary that a reliable and accurate circumference of the attachment-wheel be preserved, which I secure by the use of a true smooth-faced wheel in combination with scraper.

Having described my invention, what I claim as new is—

In combination with frame A, its grain-dropping mechanism, and a hinged bar, F, the smooth-face wheel J, and scraper, a series of fingers, L, journaled on the bar F and revolved by staples or pins on wheel J, and a trigger, N, pivoted to bar F and oscillated by fingers L, whereby the several parts are adapted to operate substantially as set forth.

In testimony whereof I affix my signature in presence of two witnesses.

HENRY L. LONG.

Witnesses:
GEORGE B. SAPP,
CHARLES A. ORTH.